United States Patent
Wu

(10) Patent No.: US 8,215,767 B2
(45) Date of Patent: Jul. 10, 2012

(54) CLIP DEVICE FOR HOLDING AUXILIARY EYEGLASSES

(75) Inventor: Chin-Gar Wu, Fujian (CN)

(73) Assignee: Roring Industries (Xiamen) Ltd., Xiamen, Fujian (CN)

( * ) Notice: Subject to any disclaimer, the term of this patent is extended or adjusted under 35 U.S.C. 154(b) by 183 days.

(21) Appl. No.: 12/873,576

(22) Filed: Sep. 1, 2010

(65) Prior Publication Data

US 2011/0234970 A1 Sep. 29, 2011

(30) Foreign Application Priority Data

Mar. 26, 2010 (CN) ...................... 2010 2 0147734 U

(51) Int. Cl.
*G02C 9/00* (2006.01)
(52) U.S. Cl. ............................................. 351/48; 351/58
(58) Field of Classification Search .................... 351/47, 351/48, 57, 58
See application file for complete search history.

(56) References Cited

U.S. PATENT DOCUMENTS 5,164,749 A * 11/1992 Shelton ............................ 351/47
6,254,232 B1 * 7/2001 Friedman ......................... 351/47

* cited by examiner

*Primary Examiner* — Huy K Mai

(57) ABSTRACT

A clip device for holding auxiliary eyeglasses includes a clip body and a retaining rivet plate. The clip body is made by injection molding and made of plastics material which has high elasticity and strong tenacity. The clip body includes a retaining portion, a resilient piece and two resilient clips. The retaining portion has a plurality of retaining holes thereon. The resilient piece is integrally formed with an upper end of the retaining portion. An upper end of each of the two resilient clips is integrally formed with an upper end of the resilient piece and protrudes outward to form a press portion. A lower end of each of the two resilient clips is a free end. The retaining rivet plate has a plurality of retaining pins. When assembling, the retaining pins of the retaining rivet plate are inserted through holes of the auxiliary eyeglasses and the retaining holes of the clip body. The retaining pins each have a distal portion exposed out of the retaining portions to be extruded and positioned thereon by hot melt. The clip device can be assembled quickly and manufactured with ease to lower the cost.

4 Claims, 6 Drawing Sheets

CLIP DEVICE FOR HOLDING AUXILIARY EYEGLASSES

BACKGROUND OF THE INVENTION

1. Field of the Invention

The present invention relates to an eyeglass auxiliary part, and more particularly to a clip device for holding auxiliary eyeglasses.

2. Description of the Prior Art

In general, eyeglasses are fixed on an eyeglass frame. The eyeglasses can't be detached from the eyeglass frame without using a tool. Due to this structure, one pair of eyeglasses only has one function. Spectacles are categorized as spectacles for nearsightedness, spectacles for long sight, plain glass spectacles, sunglasses, and so on. These days, there are 3D spectacles for watching 3D image. In some occasions, people have to wear dual-function spectacles, such as spectacles for nearsightedness having a sunglasses effect. Some spectacles have the dual-function. However, they may be limited to the environment. For example, the spectacles for nearsightedness having a sunglasses effect are adapted for outdoor or a sunny day, not for indoor or a cloudy day.

In order to solve the aforesaid problem, auxiliary eyeglasses are mounted on a primary eyeglass frame. In order to have a convenient use, the auxiliary eyeglasses are provided with a fixing structure to couple the auxiliary eyeglasses on the primary eyeglass frame, without changing the original eyeglass frame.

FIG. 1 and FIG. 2 show a conventional clip structure for holding auxiliary eyeglasses. Through the clip structure 1, the auxiliary eyeglasses 2 are clipped on a primary eyeglass frame (not shown in the drawings). The clip structure 1 comprises a fixing portion 11, a main clip 12, clip feet 13, a resilient plate 14, and a torsion spring 15. The fixing portion 11 is adapted to fix two auxiliary eyeglasses 2 together, and includes a U-shaped main bridge 111 and two clip pieces 112. Through the U-shaped main bridge 111 and the two clip pieces 112, the auxiliary eyeglasses 2 are secured with rivets. The main clip 12 has two engaging troughs, one is for engaging with the main bridge 111 and the other is for engaging with the clip feet 13. The main clip 12 has main clip feet 121. The clip feet 13 are connected with a lateral bridge 131 which is engaged with one of the engaging troughs of the main clip 12. The resilient plate 14 and the torsion spring 15 are fitted on the lateral bridge 131. The torsion spring 15 has one foot engaged with the main clip 12 and another foot engaged with the resilient plate 14. When in use, the resilient plate 14 is pressed to lift the clip feet 13, such that the auxiliary eyeglasses are clipped on the primary eyeglass frame.

This clip structure has too many parts including the fixing portion 11 made of metal, the clip feet 13, the resilient plate 14, the torsion spring 15, and the main clip 12 made of hard plastics. The rivets are required to connect the fixing portion 11 and the auxiliary eyeglasses 2 together. Each rivet needs to be punched alone. Therefore, the clip structure is complicated in manufacture and difficult in assembly and is not cost-effective. Besides, most of the clip structure is made of metallic materials, which needs spraying paint or electroplating to cause high cost.

SUMMARY OF THE INVENTION

The primary object of the present invention is to provide a clip device for holding auxiliary eyeglasses, which can be assembled quickly and manufactured with ease to lower the cost.

In order to achieve the aforesaid object, a clip device for holding auxiliary eyeglasses includes a clip body and a retaining rivet plate. The clip body is made by injection molding and made of plastics material which has high elasticity and strong tenacity. The clip body includes a retaining portion, a resilient piece and two resilient clips. The retaining portion has a plurality of retaining holes thereon. The resilient piece is integrally formed with an upper end of the retaining portion. An upper end of each of the two resilient clips is integrally formed with an upper end of the resilient piece and protrudes outward to form a press portion. A lower end of each of the two resilient clips is a free end. The retaining rivet plate has a plurality of retaining pins. When assembling, the retaining pins of the retaining rivet plate are inserted through holes of the auxiliary eyeglasses and the retaining holes of the clip body. The retaining pins each have a distal portion exposed out of the retaining portions to be extruded and positioned thereon by hot melt.

Preferably, the retaining portion has a reverse U shape and the retaining rivet plate has a reverse U shape corresponding to the retaining portion.

Preferably, the retaining portion has two lateral bridges extending outward from two upper sides thereof and the retaining rivet plate has and two bridges extending outward from two upper sides thereof corresponding to the lateral bridges of the retaining portion.

Preferably, the clip body comprises one or more resilient pieces.

The clip device for holding auxiliary eyeglasses of the present invention is composed of two parts. The resilient clip can be lifted and pressed down by using its resilience. The clip body and the retaining rivet plate are fixed by melting a distal portion of the retaining pin. Therefore, the present invention can be assembled quickly and manufactured with ease to lower the cost.

DETAILED DESCRIPTION OF THE PREFERRED EMBODIMENTS

Embodiments of the present invention will now be described, by way of example only, with reference to the accompanying drawings.

Figure 8:
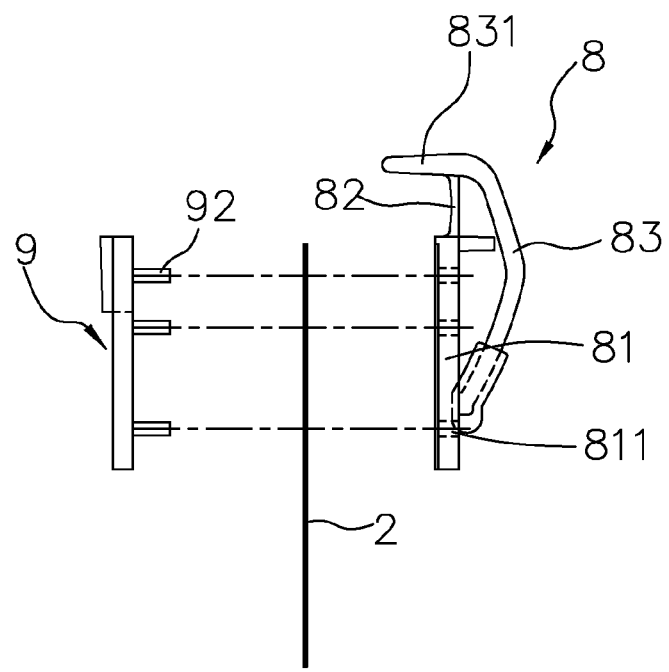
FIG. 8 is a schematic view showing the eyeglasses to be assembled according to the preferred embodiment of the present invention.
Figure 9:
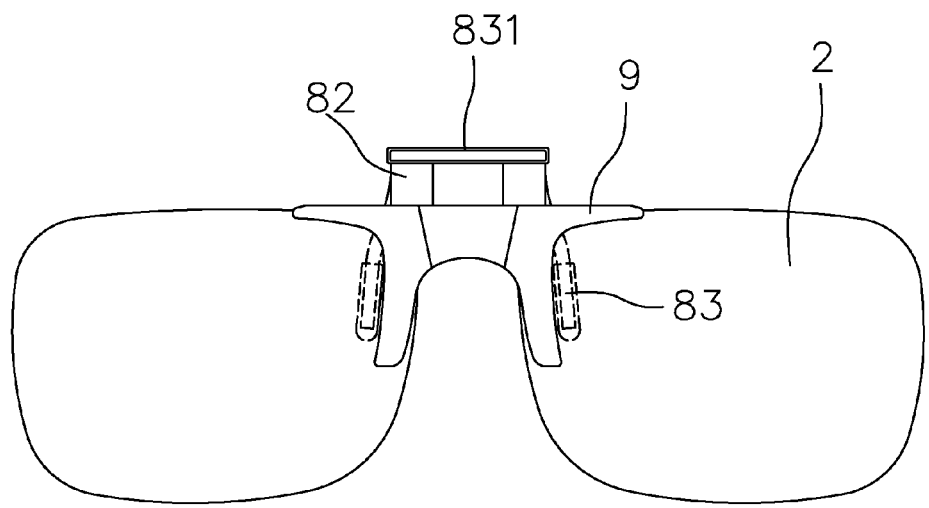
FIG. 9 is a front view of the preferred embodiment of the present invention after assembled.
Figure 10:
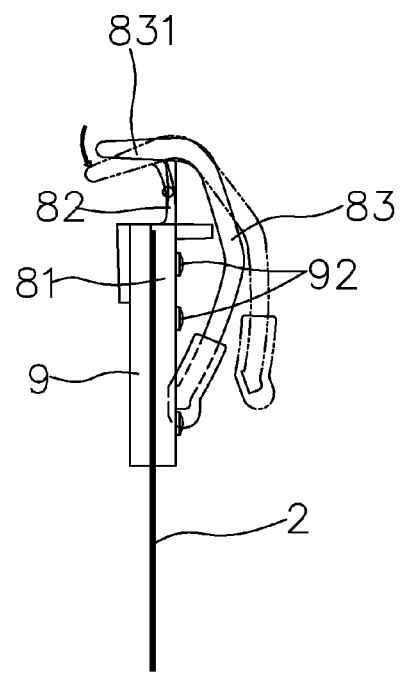
FIG. 10 is a schematic view of the preferred embodiment of the present invention when in use.

FIG. 8 and FIG. 9 show a clip device for holding auxiliary eyeglasses according to a preferred embodiment of the present invention. Two auxiliary eyeglasses 2 are mounted on a primary eyeglass frame (not shown in the drawings) through the clip device. The clip device comprises a clip body 8 and a retaining rivet plate 9.

Figure 1:
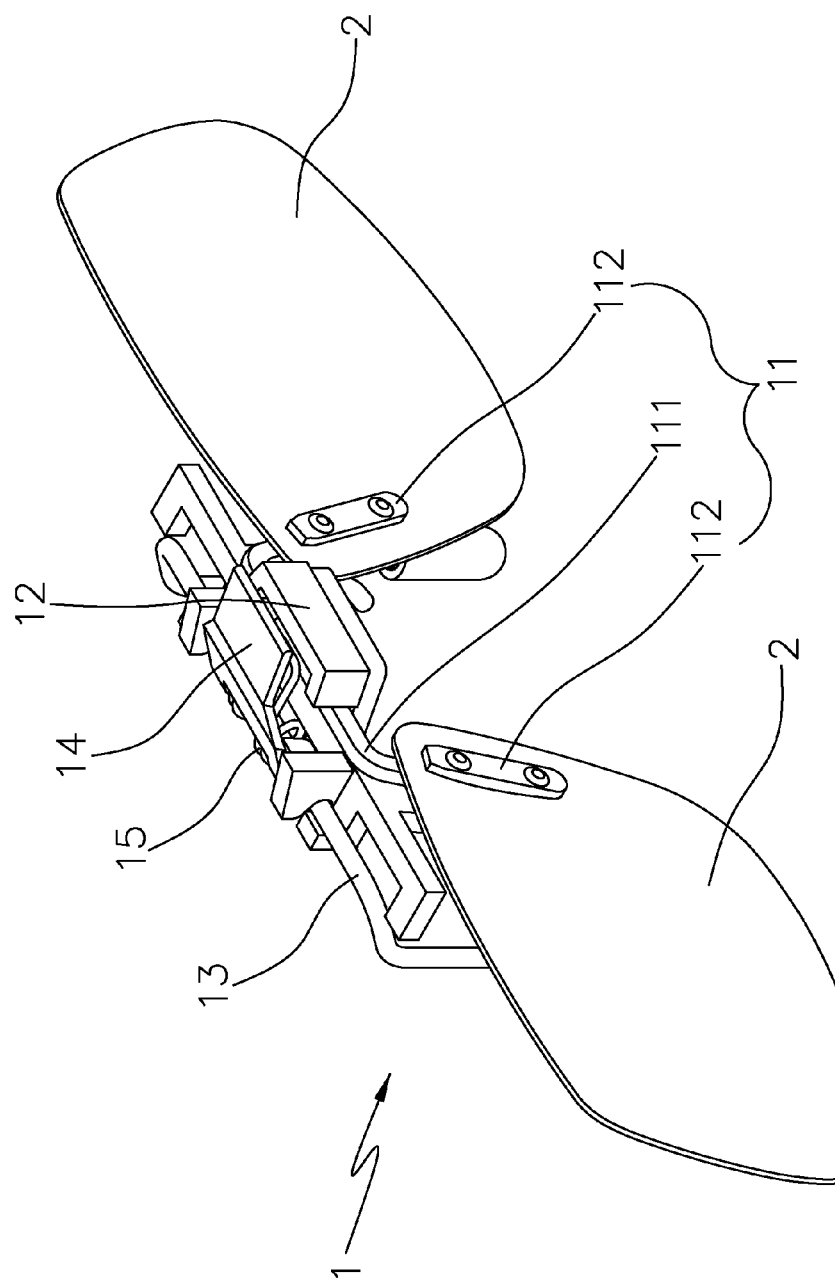
FIG. 1 is a perspective view of a conventional clip structure for holing auxiliary eyeglasses.
Figure 2:
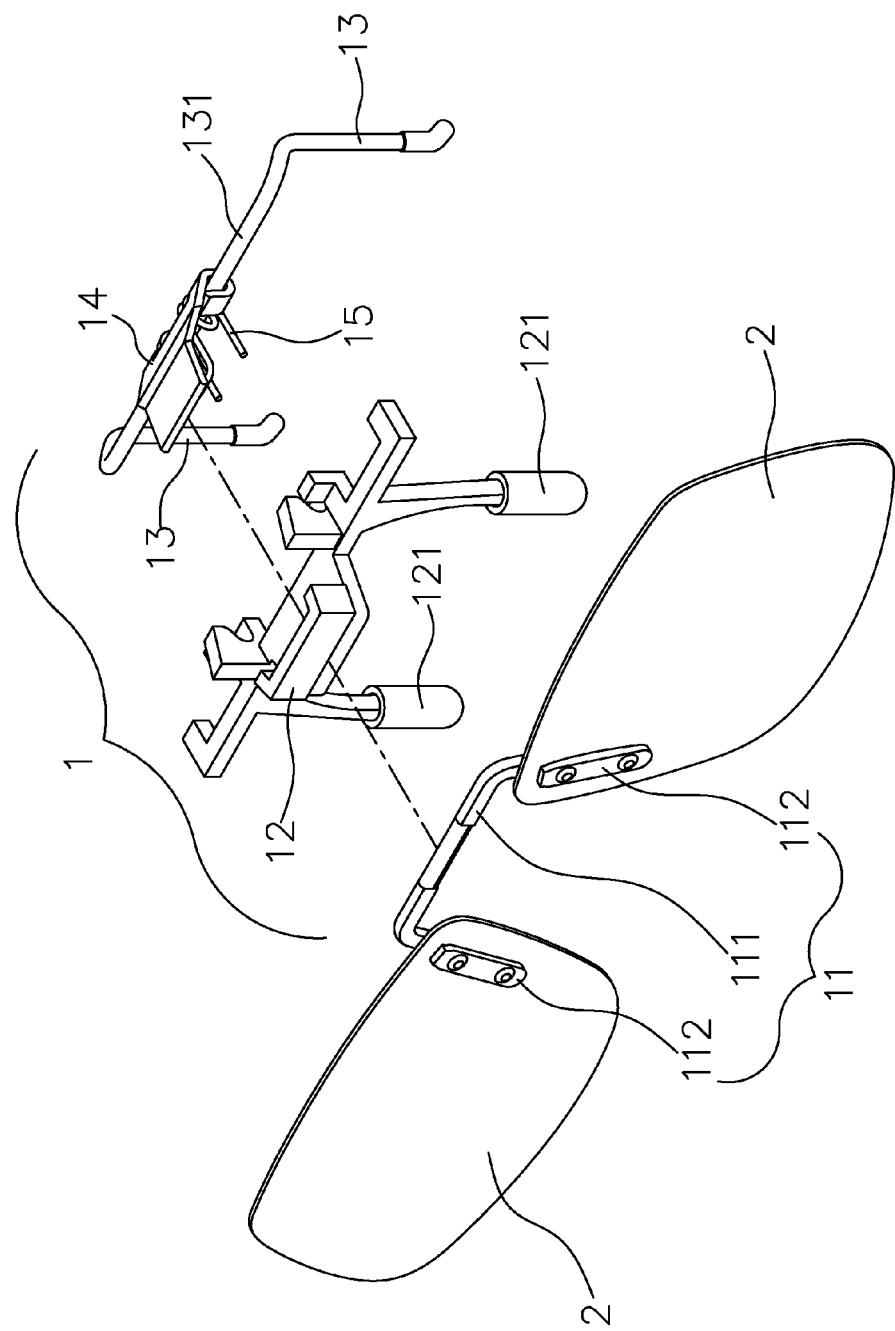
FIG. 2 is an exploded view of the conventional clip structure for holing auxiliary eyeglasses.
Figure 3:
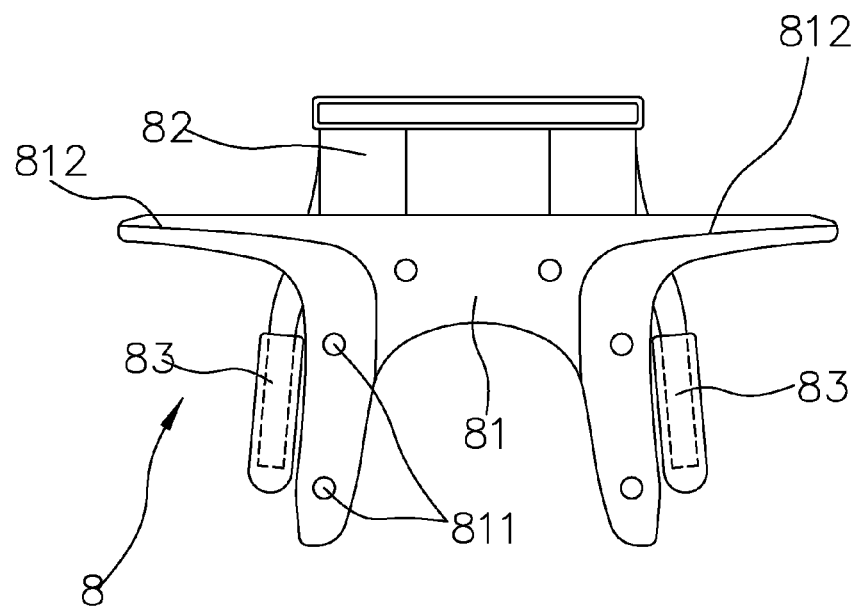
FIG. 3 is a front view of a clip device according to a preferred embodiment of the present invention.
Figure 4:
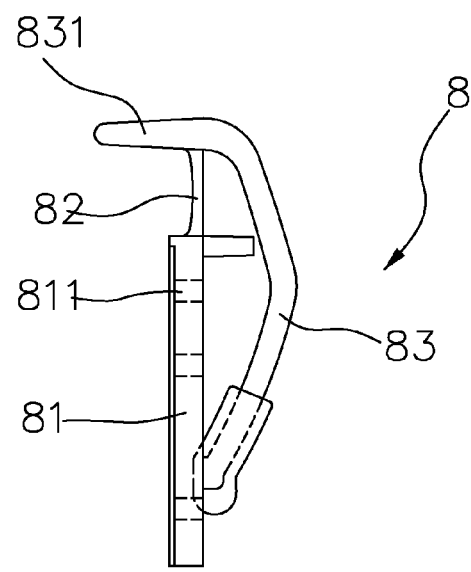
FIG. 4 is a side view of the clip device according to the preferred embodiment of the present invention.

As shown in FIG. 3 and FIG. 4, the clip body 8 is made by injection molding and made of plastics material (memory plastics) which has high elasticity and strong tenacity. The clip body 8 comprises a retaining portion 81, a resilient piece 82, and a resilient clip 83. The retaining portion 81 has a reverse U shape, a plurality of retaining holes 811 thereon, and two lateral bridges 812 extending outward from two upper sides thereof. The resilient piece 82 is integrally formed with an upper end of the retaining portion 81. The present invention can includes one resilient piece or a plurality of resilient pieces. There are two resilient clips 83 in this embodiment. An upper end of each resilient clip 83 is integrally formed with an upper end of the resilient piece 82 and protrudes outward to form a press portion 831. A lower end of each resilient clip 83 is a free end.

Figure 5:
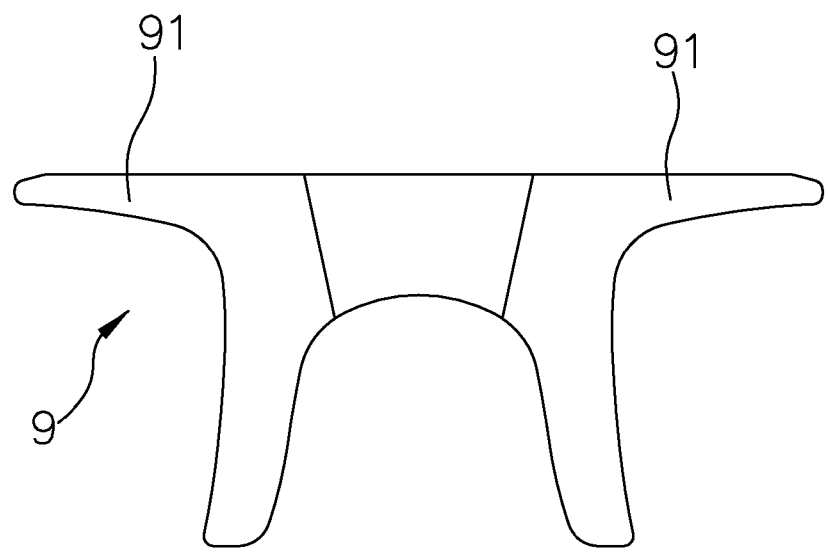
FIG. 5 is a front view of a retaining rivet plate according to the preferred embodiment of the present invention.
Figure 6:
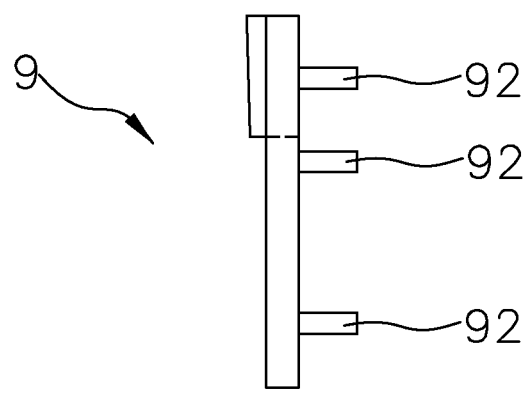
FIG. 6 is a side view of the retaining rivet plate according to the preferred embodiment of the present invention.

As shown in FIG. 5 and FIG. 6, the retaining rivet plate 9 has a reverse U shape corresponding to the retaining portion 81, a plurality of retaining pins 91 corresponding to the retaining holes 811 of the retaining portion 81, and two bridges 92 extending outward from two upper sides thereof corresponding to the lateral bridges 812 of the retaining portion 81.

Figure 7:
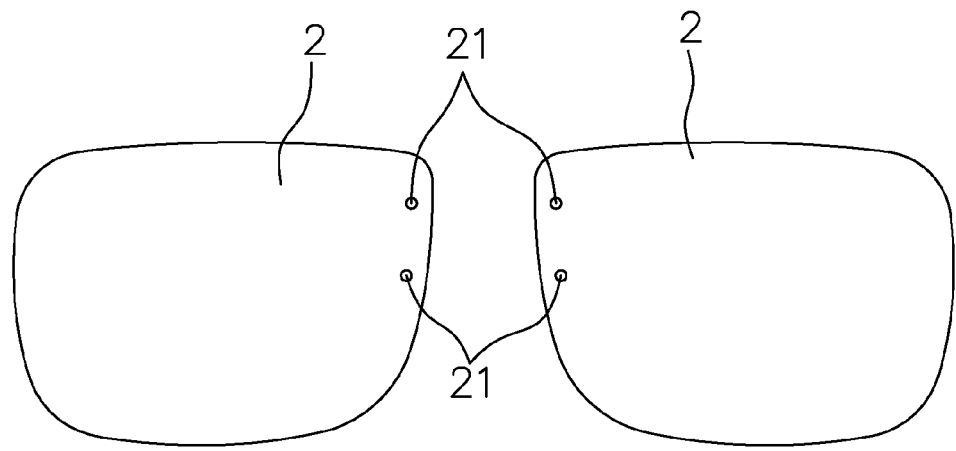
FIG. 7 is a schematic view showing eyeglasses according to the preferred embodiment of the present invention.

To assemble the present invention, as shown in FIG. 7 and FIG. 8, the retaining pins 91 of the retaining rivet plate 9 are inserted through the holes 21 of the auxiliary eyeglasses 2 and the retaining holes 811 of the clip body 8, and then the retaining pins 91 each have a distal portion exposed out of the retaining portions 81 to be extruded and positioned thereon by hot melt, such that the auxiliary eyeglasses 2 are fixed on the clip device, as shown in FIG. 9.

When in use, as shown in FIG. 8, the press portion 831 is pressed downward to bend the resilient piece 82, so that the free end of each resilient clip 83 is lifted for the auxiliary eyeglasses 2 to be clipped on the primary eyeglass frame. Through the sunshade or other function of the auxiliary eyeglasses, the auxiliary eyeglasses are clipped on the primary eyeglass frame to achieve a dual-function effect.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A clip device for holding auxiliary eyeglasses, comprising a clip body and a retaining rivet plate; the clip body being made by injection molding and made of plastics material which has high elasticity and strong tenacity, the clip body comprising a retaining portion, a resilient piece and two resilient clips, the retaining portion having a plurality of retaining holes thereon, the resilient piece being integrally formed with an upper end of the retaining portion, an upper end of each of the two resilient clips being integrally formed with an upper end of the resilient piece and protruding outward to form a press portion, a lower end of each of the two resilient clips being a free end; the retaining rivet plate having a plurality of retaining pins; when assembling, the retaining pins of the retaining rivet plate being inserted through holes of the auxiliary eyeglasses and the retaining holes of the clip body, the retaining pins each having a distal portion exposed out of the retaining portions to be extruded and positioned thereon by hot melt.

2. The clip device as claimed in claim 1, wherein the retaining portion has a reverse U shape and the retaining rivet plate has a reverse U shape corresponding to the retaining portion.

3. The clip device as claimed in claim 2, wherein the retaining portion has two lateral bridges extending outward from two upper sides thereof and the retaining rivet plate has and two bridges extending outward from two upper sides thereof corresponding to the lateral bridges of the retaining portion.

4. The clip device as claimed in claim 1, wherein the clip body comprises one or more resilient pieces.

* * * * *